US011201584B2

United States Patent
Olyschlaeger et al.

(10) Patent No.: US 11,201,584 B2
(45) Date of Patent: Dec. 14, 2021

(54) JUNCTION BOX FOR A PHOTOVOLTAIC MODULE

(71) Applicant: HANWHA Q CELLS GMBH, Bitterfeld-Wolfen (DE)

(72) Inventors: Robert Olyschlaeger, Leipzig (DE); Henning Busse, Leipzig (DE)

(73) Assignee: HANWHA Q CELLS GMBH, Bitterfeld-Wolfen (DE)

( * ) Notice: Subject to any disclaimer, the term of this patent is extended or adjusted under 35 U.S.C. 154(b) by 16 days.

(21) Appl. No.: 16/637,968

(22) PCT Filed: Aug. 1, 2018

(86) PCT No.: PCT/DE2018/100678
§ 371 (c)(1),
(2) Date: Feb. 10, 2020

(87) PCT Pub. No.: WO2019/029771
PCT Pub. Date: Feb. 14, 2019

(65) Prior Publication Data
US 2020/0186082 A1 Jun. 11, 2020
US 2021/0119575 A9 Apr. 22, 2021

(30) Foreign Application Priority Data

Aug. 10, 2017 (DE) ..................... 10 2017 118 267.5

(51) Int. Cl.
*H02S 40/34* (2014.01)
*H01R 12/71* (2011.01)
(Continued)

(52) U.S. Cl.
CPC .......... *H02S 40/34* (2014.12); *H01R 9/2425* (2013.01); *H01R 12/716* (2013.01); *H01R 13/504* (2013.01)

(58) Field of Classification Search
CPC ....... H02S 40/34; Y02E 10/50; H01R 9/2425; H01R 9/2441; H01R 12/707; H01R 12/716; H01R 13/5213; H01R 43/0256
(Continued)

(56) References Cited

U.S. PATENT DOCUMENTS 7,648,371 B2 * 1/2010 Boensch .............. H01R 13/114
439/76.1
8,139,373 B2 * 3/2012 Suzuki ................... H02S 40/34
361/800
(Continued)

FOREIGN PATENT DOCUMENTS

DE 102012102849 A1 10/2013
DE 102013101314 A1 8/2014
JP 2012059813 A 3/2012

*Primary Examiner* — Travis S Chambers
(74) *Attorney, Agent, or Firm* — Christensen, Fonder, Dardi & Herbert PLLC

(57) ABSTRACT

A junction box for an electrical connection of a photovoltaic module, comprising a plug-in module and a housing module. The plug-in module comprises a plug element and a connection element, wherein the plug element enables a plug-in connection with an external electrical connection line, and the connection element provides a connection option for an internal electrical supply line into the photovoltaic module. The housing module can be connected to, and detached from, the plug-in module and can also be attached to the photovoltaic module in order to offer protection of a connection area of the photovoltaic module against outer influences.

10 Claims, 5 Drawing Sheets

(51) Int. Cl.
*H01R 9/24* (2006.01)
*H01R 13/504* (2006.01)

(58) Field of Classification Search
USPC ............ 439/521, 76.1, 83, 620.21, 626, 628
See application file for complete search history.

(56) References Cited

U.S. PATENT DOCUMENTS

| | | | |
|---|---|---|---|
| 8,432,699 B2* | 4/2013 | Chou | ...................... H02G 3/16 |
| | | | 361/730 |
| 9,059,350 B2* | 6/2015 | Mills | .................. H01R 13/6641 |
| 9,706,660 B1* | 7/2017 | Mostoller | ................ H01R 4/48 |
| 10,476,429 B2* | 11/2019 | Mostoller | ................ H02G 3/16 |
| 2011/0220187 A1 | 9/2011 | Wang et al. | |
| 2011/0275244 A1 | 11/2011 | Duesterhoeft et al. | |
| 2016/0301155 A1* | 10/2016 | Keuten | .................. H01R 12/62 |

\* cited by examiner

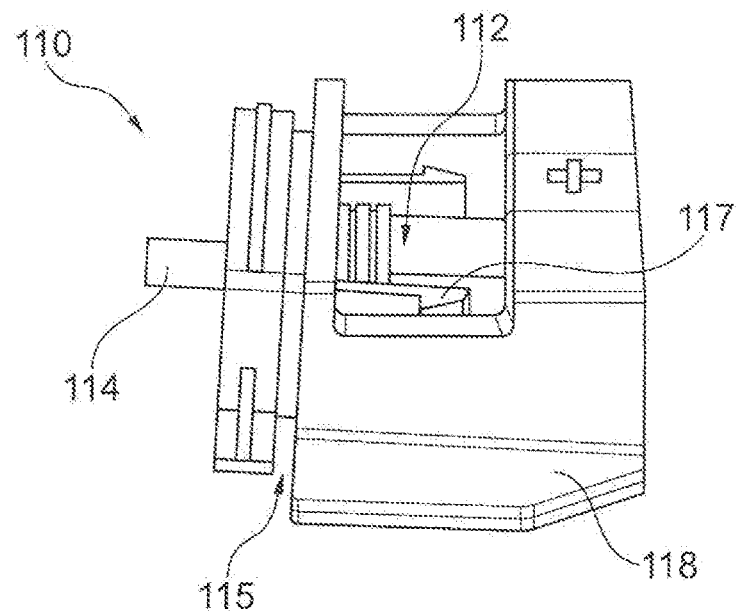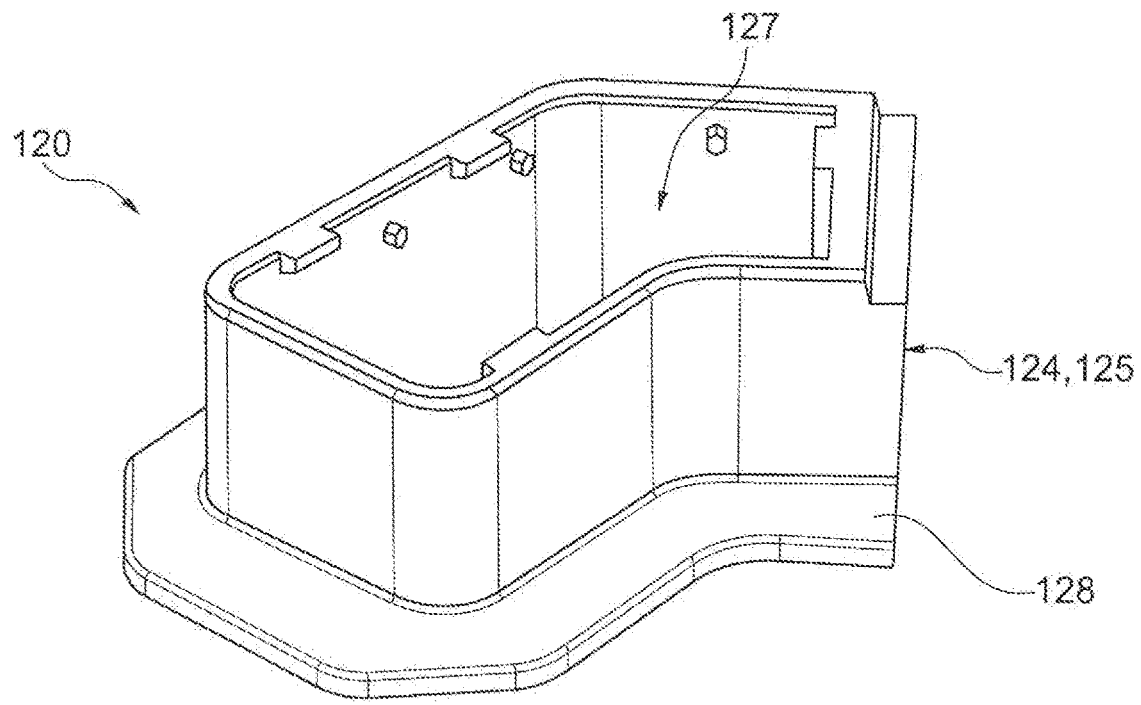
Fig. 1

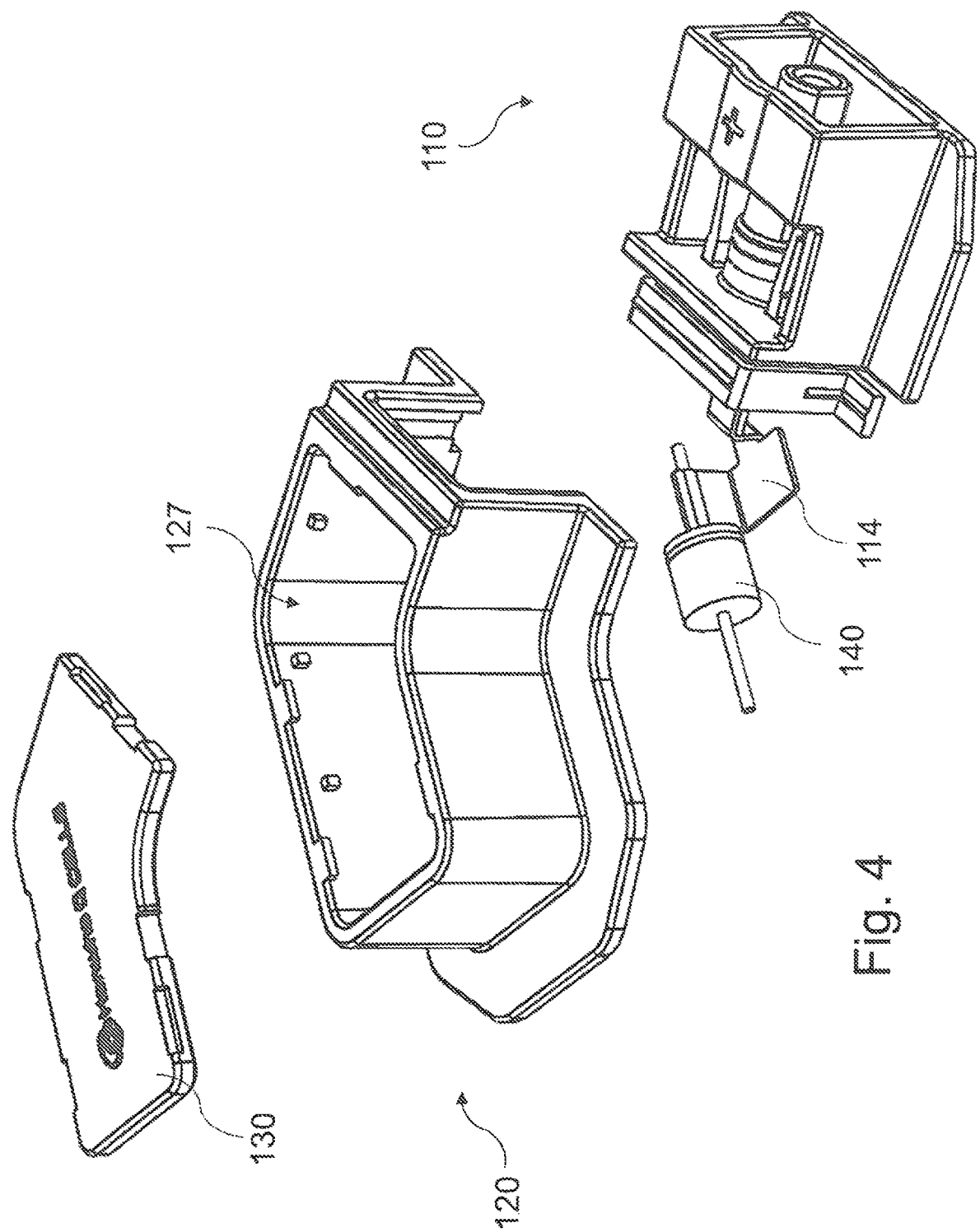

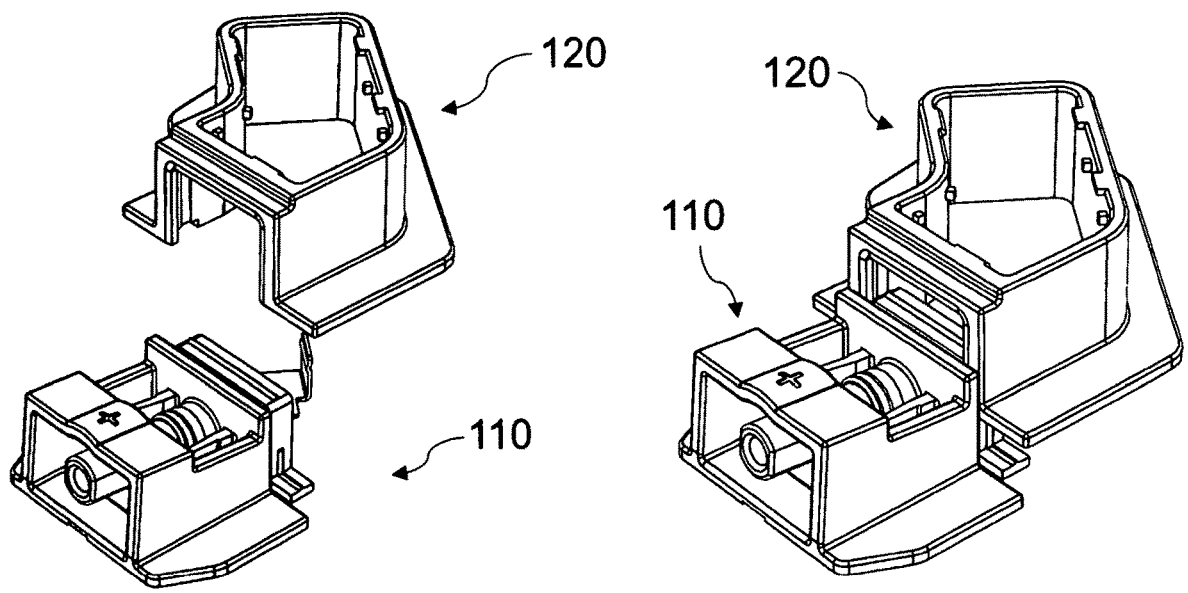
Fig. 5A
Fig. 5B
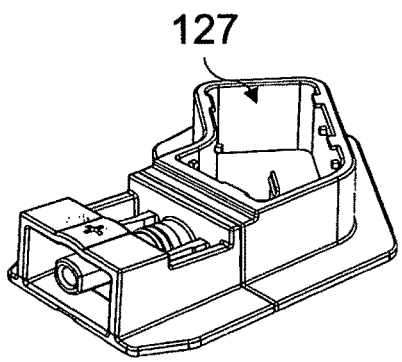
Fig. 5C
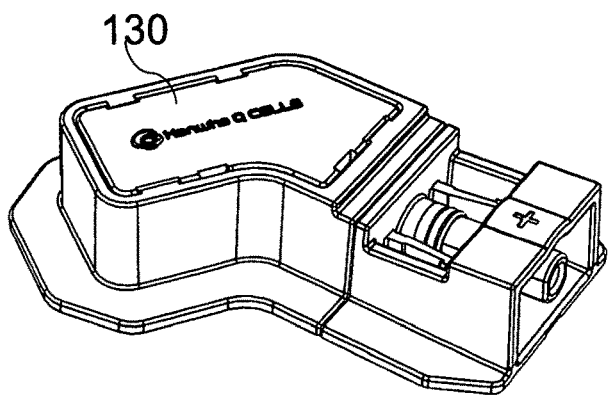
Fig. 5D

JUNCTION BOX FOR A PHOTOVOLTAIC MODULE

PRIORITY CLAIM

The present application is a National Phase entry of PCT Application No. PCT/DE2018/100678, filed Aug. 1, 2018, which claims priority from German Patent Application 10 2017 118 267.5, filed Aug. 10, 2017, the disclosures of which are hereby incorporated by reference herein in their entirety.

FIELD OF THE INVENTION

The present invention relates to a junction box for an electrical connection of a photovoltaic module. The invention also relates to a plug-in module and a housing module for a junction box, and in particular to a junction box with one or more replaceable plug-in modules.

BACKGROUND

Photovoltaic modules are usually connected to one another via plug-in connections or connected to an external electrical connection unit. For this purpose, conventional photovoltaic modules have junction boxes, from which one or more cables with a plug are guided out, which can be used for the plug-in connection mentioned. Conventional junction boxes can also have an integrated plug. In both cases, only compatible plugs can usually be used or plugged in. In principle, it is often possible to use other plugs—at least insofar as they are "pluggable"—however, this results in an increased safety risk. Since such basically pluggable plugs are not original products, no guarantee is usually accepted.

Therefore, such conventional junction boxes should only be connected to plugs that are fully compatible with the plugs manufactured by the individual manufacturers. Currently, a replacement of the complete junction boxes is required when other plug-in connections are used. This constitutes considerable expenditure and, due to the existing seal, is often difficult to implement. Therefore, it is currently impossible to equip a given junction box with other plug-in modules. This considerably limits the flexibility of use.

Therefore, there is a need for improved junction boxes for photovoltaic modules that do not have the problems mentioned above. In particular, there is a need for junction boxes that do not require a specific plug but can be used flexibly instead.

SUMMARY

At least part of the above-mentioned technical problems are solved by a junction box according to claim 1, a plug-in module according to claim 7, and a housing module according to claim 9. The dependent claims relate to advantageous developments of the subject matter of the independent claims.

The present invention relates to a junction box for an electrical connection (in a connection area) of a photovoltaic module. The junction box includes a plug-in module and a housing module. The plug-in module comprises a plug element and a connection element, wherein the plug element enables a plug-in connection to an external electrical connection line, and the connection element provides a connection option for an internal electrical supply line into the photovoltaic module. The housing module can be connected to the plug-in module and can also be attached to the photovoltaic module in order to offer protection of a connection area of the photovoltaic module against outer influences (rain, moisture, corrosion, etc.). After the installation, it is basically possible to detach the housing module and the plug-in module again, but this will likely be the exception. In general, these two components are firmly interconnected (e.g., welded), so that a subsequent detaching is not readily possible.

The plug-in module and the housing module can each be manufactured unitarily from one or different plastic materials (e.g., in an injection molding process). No type of wiring needs to be provided in both the plug-in module and the housing module. The plug-in module has one or more electrical through-connections which can be electrically contacted via the plug-in connection by means of the plug element and via the connection element. These electrical through-connections are embedded, for example, in the plastic material of the plug-in module.

Optionally, the plug-in module can comprise a diode which is attached to the connection element and provides an electrical bypass connection for at least parts of the photovoltaic module.

Optionally, the housing module comprises an opening, and the junction box comprises a cover element that is designed to close the opening of the housing module.

In addition, the plug-in module and the housing module can each have connecting means in order to interlockingly connect the plug-in module to the housing module by means of the connecting means. The connecting means can comprise, for example, a groove and/or a projection. For example, the plug-in module can have a groove and the housing module can have a projection. It is also possible that the plug-in module has a projection and the housing module has a groove. By means of said connecting means, the interlocking connection can be achieved by inserting the plug-in module into the housing module. The interlocking connection can prevent the separation of the plug-in module from the housing module after the junction box has been installed.

According to embodiments, the junction box is thus formed by two components which, for example, are only connected to one another when the junction box is installed on the photovoltaic module. It is thus possible to first connect the plug-in module to the corresponding interior supply lines of the photovoltaic module and optionally attach it to the photovoltaic module. Subsequently, the housing module can be attached using a groove connection. Finally, an ultrasonic welding process, for example, can be used to firmly connect the plug-in module to the housing module. Optionally, it is also possible to form a lid on the housing module, which finally closes the housing completely. For example, it is possible for the junction box manufacturer to interconnect the plug-in modules and the housing module, so that the finished junction boxes can then be attached to the modules. The plug-in modules and the housing module are therefore advantageously assembled beforehand. However, this is not mandatory. It is also possible that the assembly is only carried out on the module.

The connection element is optionally designed to enable a firm connection of the plug-in module to the internal electrical supply line. The firm connection can be varied. In particular, the firm connection can comprise a solder connection or a screw connection or a crimp connection or a clamped connection or a rivet connection or a welded joint.

The plug-in module and the housing module are individual components that have a material that can be welded to one another by means of an ultrasonic welding process.

For example, the plug-in module and/or the housing module can be manufactured in one injection molding process.

The present invention also relates to a plug-in module for one of the previously defined junction boxes of a photovoltaic module. The plug-in module comprises a plug element which enables a plug-in connection with the external electrical connection line, and a connection element which provides a connection option (e.g., for soldering, screwing, clamping) for an interior electrical supply line into the photovoltaic module. The plug-in module can be connected to the housing module.

The present invention also relates to a housing module for one of the previously defined junction boxes of a photovoltaic module. As described, the junction box is used to electrically connect the photovoltaic module to an external electrical connection line and comprises a plug-in module for forming a plug-in connection with an external electrical connection line. The housing module comprises an access opening (which can also be a recess) with connecting means for inserting and securely fastening the plug-in module. The housing module can be connected to (and optionally also detached from) the plug-in module and can also be attached to the photovoltaic module in order to offer a protection of a connection area of the photovoltaic module against outside influences. This housing module can additionally comprise a lid which closes an additional opening in the housing module.

According to embodiments, the junction box can particularly be formed in a completely wireless manner. In conventional junction boxes, plugs are mainly attached to cables, wherein the cables are formed between the plugs and the junction box and establish the electrical connection from the plug to the photovoltaic module. Such cables are no longer required with the novel junction box. Since the cables are mostly welded or crimped to the plug, a subsequent replacement of the plugs is impossible. In contrast, in embodiments of the present invention, the plug-in module can be replaced flexibly—at least prior to the firm connection (e.g., by welding), so that the desired compatibility with different manufacturers is achieved.

Embodiments thus overcome the disadvantages of conventional junction boxes which have a fixed plug unit (wireless or one-sided cable) and which can only be reliably connected using plugs from a specific manufacturer. Embodiments therefore allow for a significantly greater design freedom and flexibility with regard to the use of the junction boxes for plug-in connections from different manufacturers. In addition, module manufacturers have the option of using different plug-in modules for a product freely, or according to customer requirements, during or shortly before assembling the photovoltaic module.

BRIEF DESCRIPTION OF THE DRAWINGS

The embodiments of the present invention will be better understood from the following detailed description and the attached drawings, which should not be construed as limiting the disclosure to the specific embodiments but are used for explanation and clarity only.

FIG. 1 shows a 2-component junction box for a photovoltaic module according to an embodiment of the present invention.

FIG. 4 shows an embodiment with a cover element for the housing module.

FIGS. 5A-5D show the process of connecting the components from FIG. 4.

DETAILED DESCRIPTION

Figure 2:
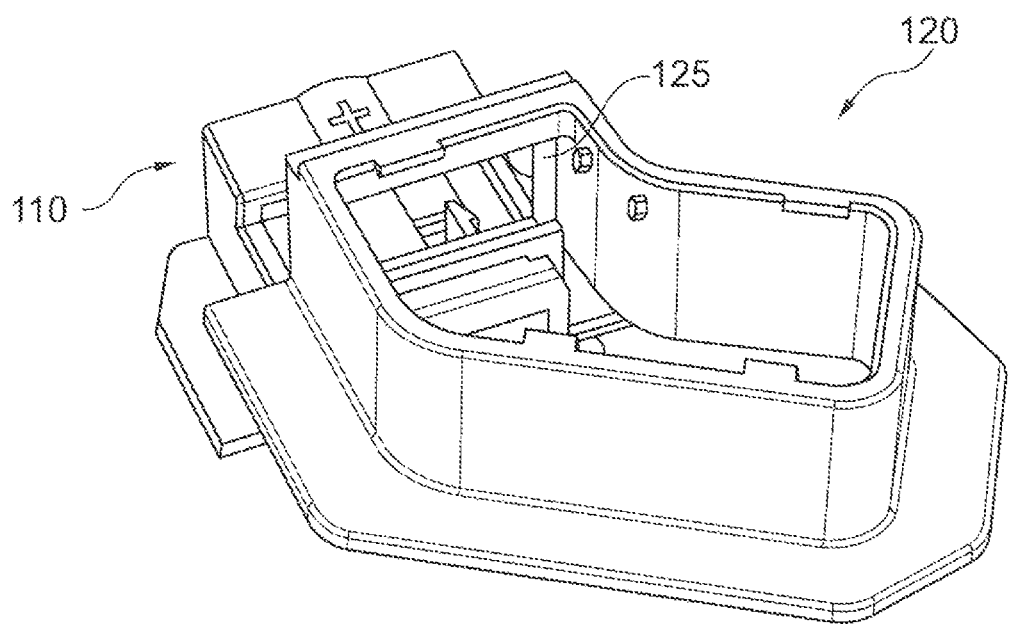
FIG. 2 shows a connection of the components from FIG. 1 before the junction box is attached to the photovoltaic module.

FIG. 1 shows an embodiment of a junction box for an electrical connection of a photovoltaic module. The junction box comprises a plug-in module 110 and a housing module 120. The plug-in module 110 comprises a plug element 112 and a connection element 114, wherein the plug element 112 enables a plug-in connection with an external electrical connection line (not depicted) and the connection element 114 provides a connection option for an internal electrical supply line into the photovoltaic module. The housing module 120 can be connected to, and also detached from, the plug-in module 110. In addition, the housing module 120 can be attached to the photovoltaic module in order to offer protection of a connection area of the photovoltaic module against outer influences. The plug-in module 110 and the housing module 120 are separate components of the junction box.

The plug element 112 of the plug-in module 110 is formed, for example, opposite the connection element 114. Between the plug element 112 and the connection element 114, an electrical through-connection, for example, is provided which conducts the electrical current from the photovoltaic module via the connection element 114 to the plug element 112. In FIG. 1, the plug element 112 also comprises an optional locking element 117 which is used to hold the plug-in connection.

In addition, the plug-in module 110 comprises a projection 118 which is formed such that it extends parallel to the surface of the photovoltaic module after the junction box has been securely fastened on the photovoltaic module. It is used for the firm connection of the junction box on the photovoltaic module. This connection can comprise, for example, lamination, or welding, or gluing.

The housing module 120 optionally has an opening 127, which can be closed by a cover element (not shown in FIG. 1). In addition, the housing module 120 comprises an access opening or recess 124 with connecting means 125 (e.g., a projection; see also FIG. 2), and the plug-in module 110 comprises connecting means or connecting structure 115 (which are designed, for example, as a groove) which can mesh with one another in order to produce an exemplary groove connection. This can be done, for example, by sliding the plug-in module 110 into the housing module 120. As a result, a firm hold of the plug-in module 110 in the housing module 120 is achieved.

The access opening 124 can be formed on a side surface of the housing module 120 and thus perpendicularly or non-parallel to the main surface direction of the photovoltaic module. The optional opening 127 and the access opening 124 can define opening directions that are perpendicular to one another.

Furthermore, the housing module 120 can also comprise a projection 128 which is used to securely fasten the junction box on the photovoltaic module and is formed such that it extends parallel to the photovoltaic module after the junction box is securely fastened on the photovoltaic module. As stated, the fastening can take place, for example, by means of a laminate connection or by means of an adhesive connection or welding.

The plug-in module 110 and the housing module 120 can be manufactured particularly by injection molding. In comparison to the prior art, the injection molds used are simpler or reusable in embodiments due to the modular structure.

FIG. 2 shows an assembly of the plug-in module 110 with the housing module 120, so that the composite can then be installed or fastened on the photovoltaic module. When the junction box is installed on the photovoltaic module, the plug-in module 110 can first be electrically connected to the photovoltaic module by means of the connection element 114. Subsequently, the plug-in module 110 can be inserted into the access opening 124 of the housing module 120 via the exemplary groove connection 115, 125. The plug-in module 110 and the housing module 120 are typically connected by means of a predetermined connection geometry (by means of an interlocking connection). In addition to the specific grooves or projections shown, other suitable counterparts that achieve an interlocking connection (e.g., by inserting or clamping) can also be used for this purpose.

Optionally, it is also possible for the plug-in module 110 to be welded to the housing module 120 after the groove connection has been formed. For example, an ultrasonic welding process can be used for this purpose. However, it is also possible for the plug-in module 110 and the housing module 120 to be firmly and tightly interconnected by means of an adhesive connection. This connection can particularly be airtight and watertight in order to prevent the penetration of atmospheric humidity. In principle, any joining process is possible.

A firm connection between the junction box and the photovoltaic module can ultimately be established via the projections 128, 118 of the housing element 120 and the plug-in module 110. Finally, a cover element can be used to close the opening 127 of the housing module 120.

It goes without saying that the sequence of the individual work steps for installing the junction box can take place in a different sequence. For example, it is also possible to first insert the plug-in module 110 into the housing module 120 and to jointly fasten them on the photovoltaic module. Subsequently, the electrical contacting of the connection element 114 to the supply line of the photovoltaic module can be established.

Figure 3:
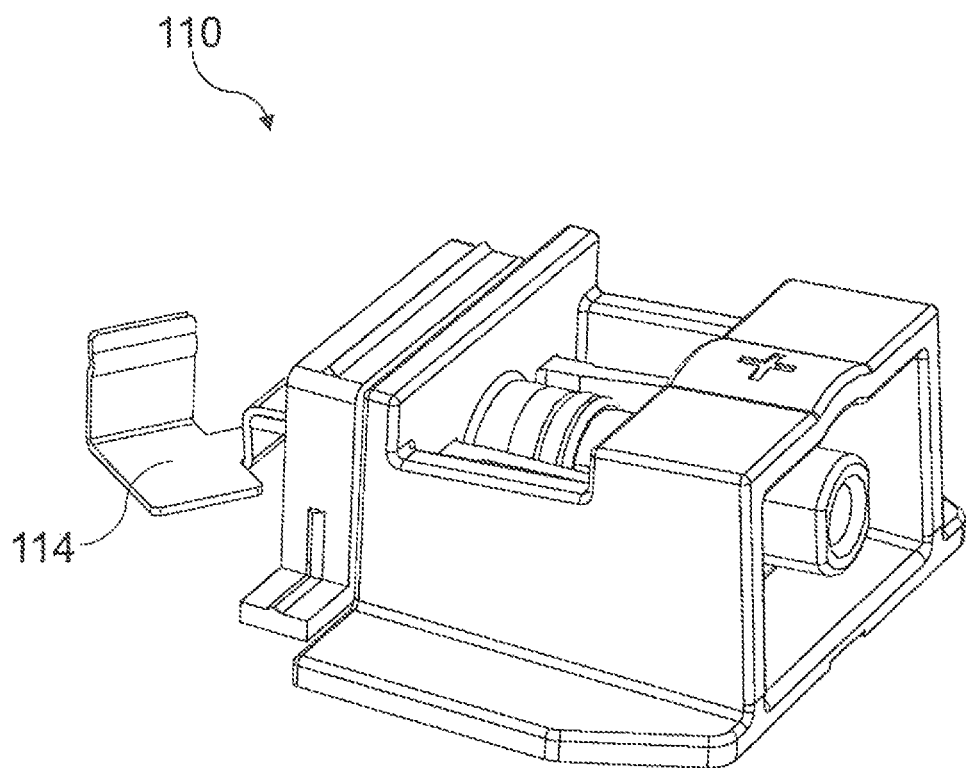
FIG. 3 shows a further embodiment of the plug-in module.

FIG. 3 shows a further embodiment for the plug-in module 110. In the depicted embodiment, the connection element 114 comprises a connection option for a bypass component, for example, a diode which is designed to bridge at least parts of the photovoltaic module (e.g., in the case of shadowing or defects). All further features of the plug-in module 110 are designed in the same manner as was described in FIGS. 1 and 2.

FIG. 4 shows a further embodiment for the housing module 120 with an optional cover element 130 (or lid) 130 which closes the existing opening 127. The plug-in module 110 is designed in the same way as shown in FIG. 3, wherein the diode 140 in the embodiment is fastened to the connection elements 114. The attachment can be established, for example, via a clamped connection, solder connection, crimp connection, or welded joint. The diode 140 can therefore be attached directly to the connection element 114 of the plug-in module 110 even before the plug-in module 110 and the housing module 120 are assembled.

FIGS. 5A and 5B illustrate the process of connecting the plug-in module 110 and the housing module 120, wherein, as in the embodiment of FIG. 1 or FIG. 2, a groove is again utilized to connect the plug-in module 110 to the housing module 120 in an interlocking manner. The resulting composite is shown in FIG. 5C. The opening 127 in the housing module 120 is finally closed with the lid 130. FIG. 5D shows the junction box thus produced, which can subsequently be attached to a photovoltaic module.

In further embodiments, not only a single plug-in module 110 is provided. A multiplicity of different plug-in modules can also be formed such that they can be connected to a standard housing module 120. It is thus possible for the junction box to be compatible with different plugs from different manufacturers. As a result, a desired plug-in module 110 can be selected and used flexibly in accordance with specifications. This increases the flexibility with regard to the installation and the manufacturing process (e.g., an easier introduction of metal contacts is possible).

A further advantage of embodiments is that only the plug-in module 110 needs to be replaced in order to be compatible with a different manufacturer. It is therefore not necessary to replace the entire junction box. In addition, the certification of the plug-in connection can be carried out solely for the plug-in module 110 and not for the entire junction box.

A further advantage is the option of producing the individual modules separately during prefabrication. As a result, the housing module 120 can be manufactured in large quantities for a wide variety of plug-in modules 110. The plug-in modules 110 are then manufactured in accordance with the specifications of the individual manufacturers for connecting plug-in connections. The individual components need only be joined during installation to form the end product.

Finally, embodiments are advantageous because they provide the option of wireless junction boxes that can be mass-produced and are compatible with different plug-in connections from different plug manufacturers. As stated, the plurality of components comprises the plug-in module 110 and the housing module 120, but can also include the lid. It goes without saying that the plug-in module 110 does not have to be a lid for the housing module 120, or only if the current is also supplied or conducted away through the lid.

The features of the invention disclosed in the description, the claims, and the drawings can be essential for the realization of the invention both individually and in any combination.

LIST OF REFERENCE SIGNS

110 Plug-in module
112 Plug element
114 Connection element
115, 125 Groove connection
117 Locking element
118, 128 Retaining projections
120 Housing module
124 Access opening
127 Opening
130 Cover element
140 Diode

The invention claimed is:

1. A junction box for an electrical connection of a photovoltaic module, comprising:
    a plug-in module with a plug element, a connection element, and a first retaining projection, wherein the plug element enables a plug-in connection with an external electrical connection line, the connection element provides a connection option for an internal electrical supply line into the photovoltaic module, the first retaining projection defines a first planar surface configured to contact a first portion of the photovoltaic module; and a housing module which is connectable to the plug-in module and also attachable to the photovoltaic module in order to offer protection of a connection area of the photovoltaic module against external influences, and includes a second retaining projection that defines a second planar surface configured to contact a second portion of the photovoltaic module, wherein the first retaining projection abuts the second retaining projection when the housing module is connected to the plug-in module such that the first planar surface and the second planar surface are coplanar.

2. The junction box according to claim 1, wherein the housing module includes an opening, and the junction box further comprises a cover element which is designed to close the opening of the housing module.

3. The junction box according to claim 1, wherein the plug-in module and the housing module each include connecting structure in order to interlockingly connect the plug-in module to the housing module by means of the connecting structure, and the connecting structure defines a groove and includes a projection.

4. The junction box according to claim 1, wherein the connection element is designed to enable a firm connection of the plug-in module to the interior electrical supply line, and the firm connection comprises a solder connection or a screw connection or a rivet connection or a crimp connection or a welded joint or a clamped connection.

5. The junction box according to claim 1, wherein the plug-in module has a bypass component, in particular a diode, which is attached to the connection element.

6. The junction box according to claim 1, wherein the plug-in module and the housing module are individual components that comprise a material that can be welded by means of ultrasonic welding processes.

7. The junction box of claim 1, wherein the first retaining projection forms a plate-like structure that projects from a perimeter side of the plug-in module, and the housing module forms a plate-like structure that projects from a perimeter side of the housing module.

8. A method of mounting a junction box with a plug-in module and a housing module onto a photovoltaic module, comprising:

connecting the plug-in module to the photovoltaic module using retaining projections having first planar surfaces on the plug-in module, thereby causing the first planar surfaces to contact a first portion of the photovoltaic module, connecting interior supply lines to the photovoltaic module;

subsequently, mounting the housing module using a groove connection; and connecting the housing module to a second portion of the photovoltaic module utilizing retaining projections of the housing module, the retaining projections of the housing module including second planar surfaces, such that when the housing module is connected to the second portion of the photovoltaic module, the retaining projections of the plug-in module abut the retaining projections of the housing module, and the second planar surfaces of the housing module are in contact with the second portion of the photovoltaic module and are coplanar with the first planar surfaces of the plug-in module.

9. The method of claim 8, further comprising welding the plug-in module to the housing module.

10. The method of claim 8, wherein connecting the plug-in module to the photovoltaic module and connecting the housing module to the photovoltaic module comprises connecting the retaining projections of the plug-in module and the housing module to the photovoltaic module using lamination.

* * * * *